(12) United States Patent
Balraj et al.

(10) Patent No.: US 8,964,644 B2
(45) Date of Patent: Feb. 24, 2015

(54) METHODS AND CIRCUITS FOR DETERMINING FEEDBACK INFORMATION

(71) Applicants: Rajarajan Balraj, Duesseldorf (DE);
Biljana Badic, Duesseldorf (DE);
Tobias Scholand, Muelheim (DE)

(72) Inventors: Rajarajan Balraj, Duesseldorf (DE);
Biljana Badic, Duesseldorf (DE);
Tobias Scholand, Muelheim (DE)

(73) Assignee: Intel Mobile Communications GmbH, Neubiberg (DE)

( * ) Notice: Subject to any disclaimer, the term of this patent is extended or adjusted under 35 U.S.C. 154(b) by 63 days.

(21) Appl. No.: 13/663,598

(22) Filed: Oct. 30, 2012

(65) Prior Publication Data
US 2014/0119278 A1    May 1, 2014

(51) Int. Cl.
*H04W 4/00* (2009.01)

(52) U.S. Cl.
USPC .......................................... 370/328; 370/252

(58) Field of Classification Search
USPC .......... 370/252, 328, 329, 336, 338, 345, 401
See application file for complete search history.

(56) References Cited

U.S. PATENT DOCUMENTS

| 2011/0170435 | A1* | 7/2011 | Kim et al. | 370/252 |
|---|---|---|---|---|
| 2012/0213108 | A1* | 8/2012 | Ji et al. | 370/252 |
| 2012/0224551 | A1* | 9/2012 | Ding et al. | 370/329 |
| 2012/0287799 | A1* | 11/2012 | Chen et al. | 370/252 |
| 2013/0053078 | A1* | 2/2013 | Barbieri et al. | 455/509 |
| 2013/0273950 | A1* | 10/2013 | Sun et al. | 455/501 |
| 2013/0279363 | A1* | 10/2013 | Huang et al. | 370/252 |
| 2013/0294352 | A1* | 11/2013 | Park et al. | 370/328 |

FOREIGN PATENT DOCUMENTS

WO    2011115421 A2    9/2011

OTHER PUBLICATIONS

3GPP TS 36.213 version 10.5.0 Release 10; LTE; Evolved Universal Terrestrial radio Access (E-UTRA); Physical Layer Procedures; Mar. 2012, p. 1-127.
Aleksandar Damnjanovic, et al.; IEEE Wireless Communications, Jun. 2011: A Survey on 3GPP Heterogeneous Networks, p. 1-12.
Ralf Irmer, et al.; IEEE Communications Magazine, Feb. 2011: Coordinated Multipoint: Concepts, Performance, and Field Trial Results, p. 1-10.
Stefan Brueck; 2011 8th International Symposium on Wireless Communication Systems; Aachen: Heterogeneous Networks in LTE-Advanced, p. 1-5.
3GPP TSG RAN WG1 Meeting #64, Taipei, Taiwan, Feb. 21-25, 2011; Preliminary CoMP JP Results for Homogenous Networks, p. 1-4.

* cited by examiner

*Primary Examiner* — Ricky Ngo
*Assistant Examiner* — Christine Ng
(74) *Attorney, Agent, or Firm* — Eschweiler & Associates, LLC

(57) ABSTRACT

A method includes receiving at a circuit an information on a partitioned time interval wherein the partitioned time interval includes a first time element and a second, different time element. The method further includes determining a single-cell feedback information based on first data wherein the first data is received by the circuit during the first time element. The method further includes determining a multi-cell feedback information based on second data wherein the second data is received by the circuit during the second time element.

24 Claims, 6 Drawing Sheets

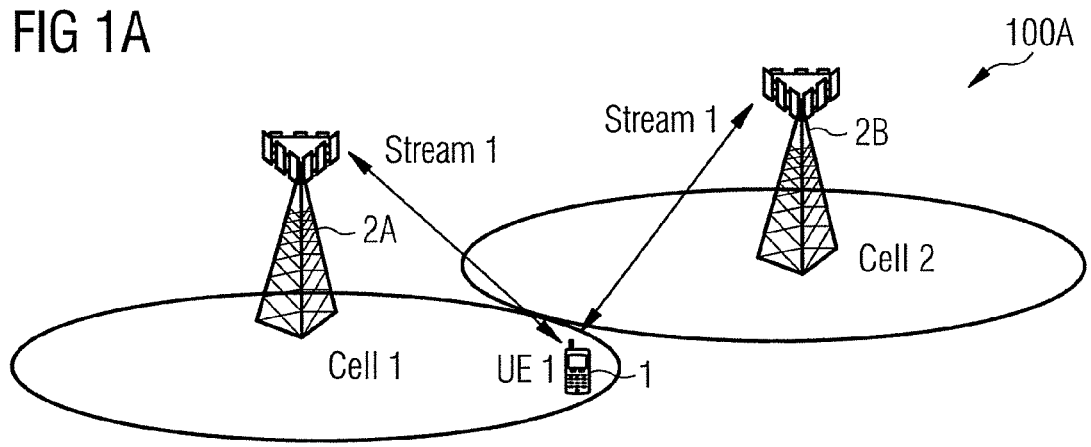
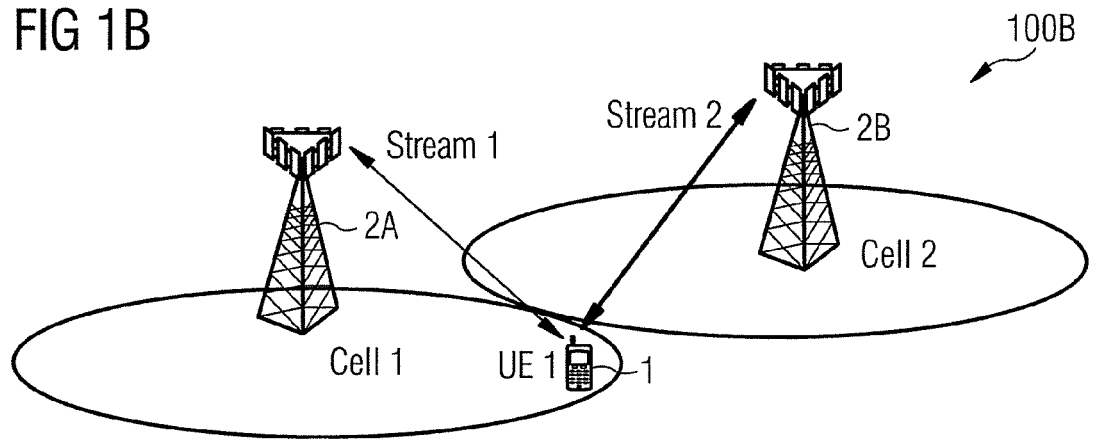

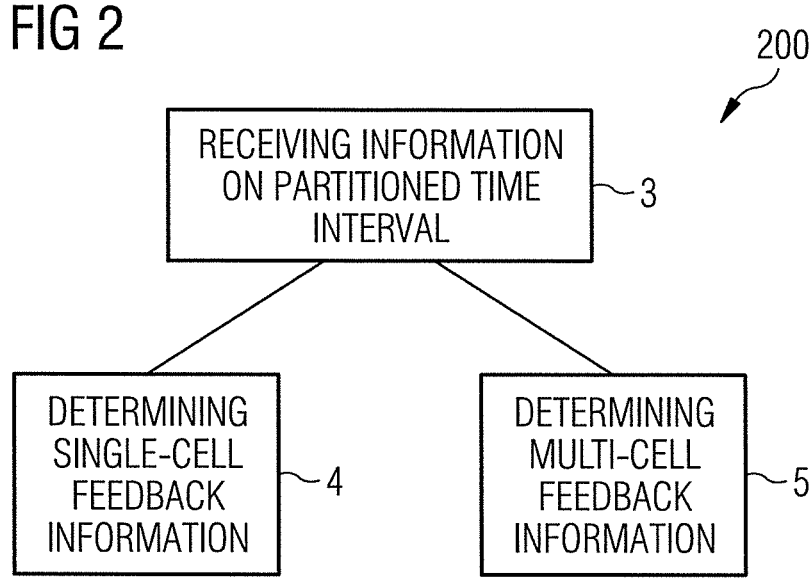
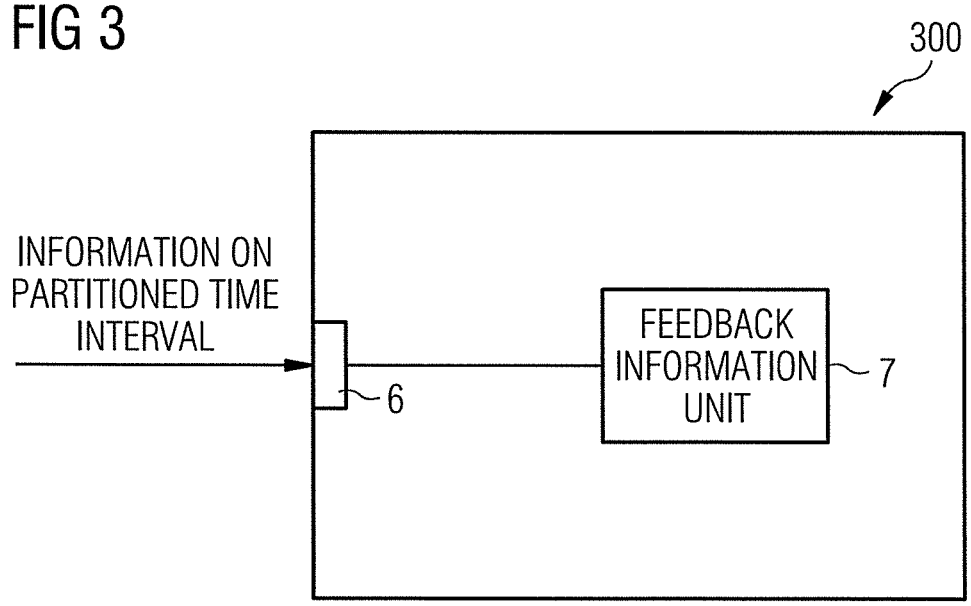

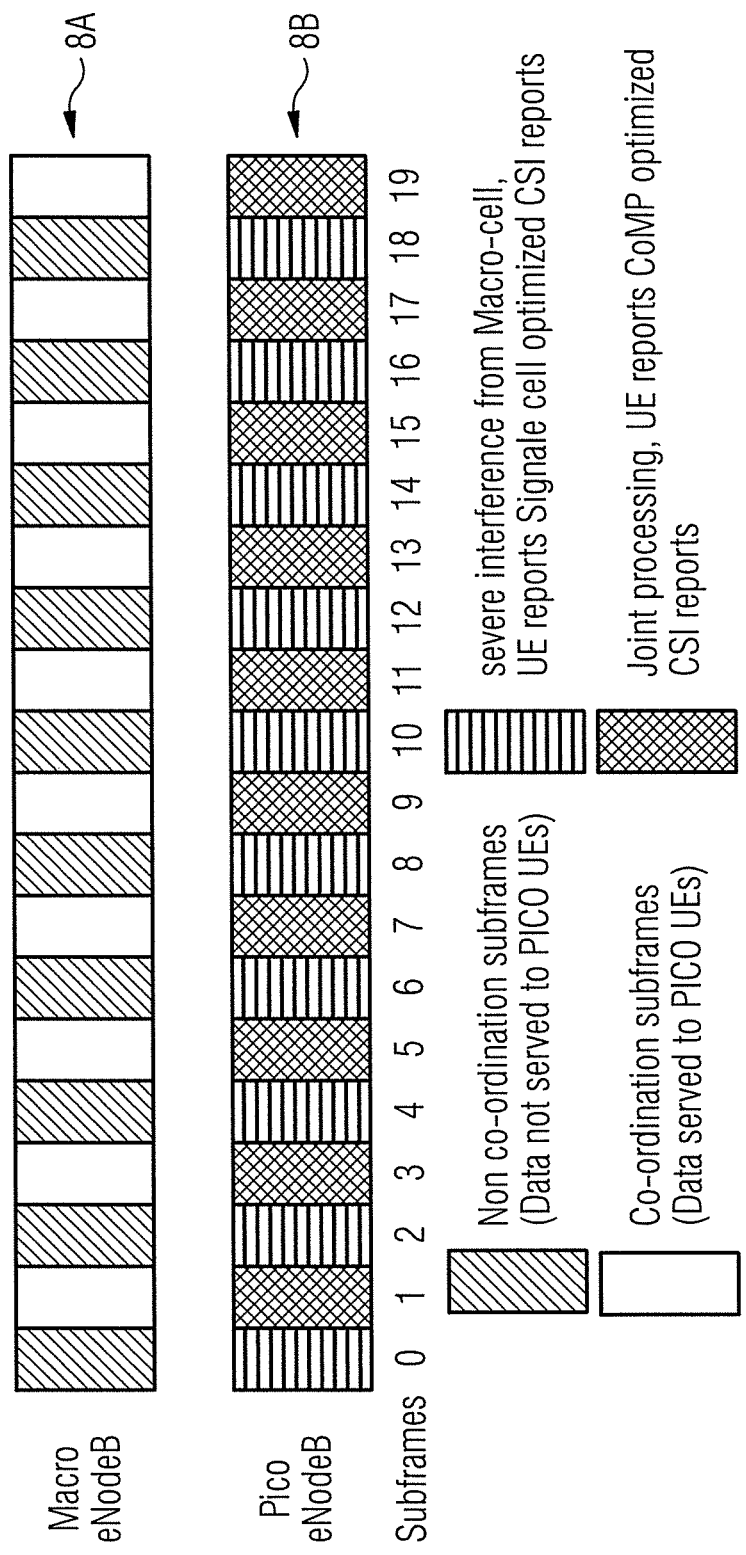

METHODS AND CIRCUITS FOR DETERMINING FEEDBACK INFORMATION

FIELD

The present invention relates to mobile communications. In particular, the invention relates to methods for determining feedback information and circuits configured to perform such methods.

BACKGROUND

In radio communications systems, a mobile station may communicate with multiple base stations that may be of different type. Based on feedback information provided by the mobile station to the base stations, a data transmission from the base stations to the mobile station may be adjusted. Methods for determining feedback information and circuits to perform such methods constantly have to be improved. In particular, it may be desirable to provide feedback information that may result in an improved communication between components of a radio communications system.

BRIEF DESCRIPTION OF THE DRAWINGS

Aspects of the disclosure are made more evident by way of example in the following detailed description when read in conjunction with the attached drawing figures, wherein:

FIG. 1A illustrates a radio communications system 100A including a mobile station and multiple base stations.

FIG. 1B illustrates a radio communications system 100B including a mobile station and multiple base stations.

FIG. 2 illustrates an exemplary method 200 for determining feedback information based on a partitioned time interval.

FIG. 3 illustrates an exemplary circuit 300 configured to determine feedback information, e.g. by performing a method similar to method 200.

FIG. 5 illustrates patterns representing a partitioned time interval that may be used for performing a method for determining feedback information.

DETAILED DESCRIPTION

Figure 4A:
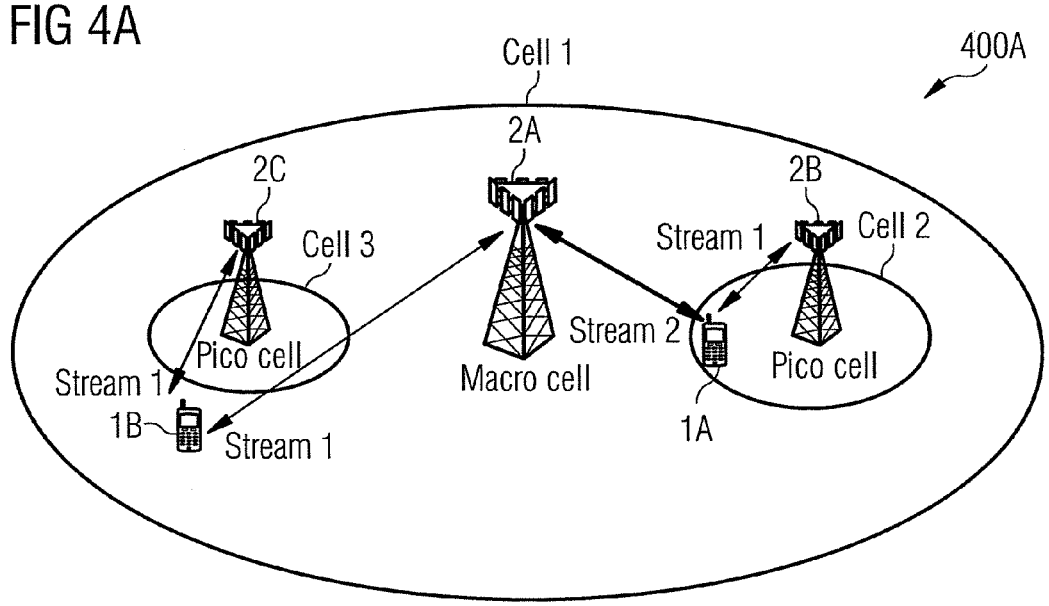
FIG. 4A illustrates a heterogeneous radio communications system 400A in a first scenario.

In the following detailed description, reference is made to the accompanying drawings, which form a part thereof, and in which are shown by way of illustration examples in which the disclosure may be practiced. It is understood that further examples may be utilized and structural or logical changes may be made without departing from the scope of the present disclosure. The features of the various examples described herein may be combined with each other, unless specifically noted otherwise. The following detailed description is therefore not to be taken in a limiting sense and the scope of the present disclosure is defined by the appended claims.

As employed in this specification, the terms "coupled" and/or "connected" are not meant to mean in general that elements must be directly coupled or connected together. Intervening elements may be provided between the "coupled" or "connected" elements. However, although not restricted to that meaning, the terms "coupled" and/or "connected" may also be understood to optionally disclose an aspect in which the elements are directly coupled or connected together without intervening elements provided between the "coupled" or "connected" elements.

As employed in this specification, to the extent that the terms "include", "have", "with" or other variants thereof are used in either the detailed description or the claims, such terms are intended to be inclusive in a manner similar to the term "comprise". The term "exemplary" is merely meant as an example, rather than the best or optimal.

Devices, e.g. circuits, in accordance with the disclosure may be implemented in discrete circuits, partially integrated circuits or fully integrated circuits. In addition, devices in accordance with the disclosure may be implemented on a single semiconductor chip or on multiple semiconductor chips connected to each other. It is understood that components of the specified devices may be implemented in software or in dedicated hardware or partially in software and partially in dedicated hardware.

Devices in accordance with the disclosure may be illustrated in form of block diagrams. It is understood that separated blocks of such block diagrams do not necessarily relate to hardware components or software components that need to be separated in practice. Rather, it may also be possible that multiple blocks (in the block diagram) may be implemented in form of a single component (in practice) or that a single block (in the block diagram) may be implemented in form of multiple components (in practice).

Block diagrams illustrating methods do not need to necessarily imply a specific chronological order of included method steps. Rather, indicated method steps may be performed in an arbitrary order, if reasonable from a technical point of view. Further, one or more method steps may at least partially be performed at a same time or during a same time period.

In the following, various methods in accordance with the disclosure are described. It is understood that each method may be modified by adding further method acts. In particular, a method may be extended by one or more method acts described in connection with a respective other method. Additional method acts may also be derived by all further parts of this specification, unless specifically noted otherwise. It is understood that specified features of individual methods may be combined in arbitrary ways resulting in further examples which are not explicitly described for the sake of simplicity.

It is noted that comments made in connection with a described method may also hold true for a corresponding circuit or device configured to perform the method and vice versa. For example, if a specific method act is specified, a corresponding device or circuit may include a unit to perform the described method act, even if such unit is not explicitly described or illustrated in the figures.

Methods and devices in accordance with the disclosure may be used in various wireless communication networks, e.g. CDMA, TDMA, FDMA, OFDMA, SC-FDMA networks, etc. A CDMA network may implement a radio technology such as UTRA, cdma2000, etc. UTRA includes W-CDMA and other CDMA variants. cdma2000 covers IS-2000, IS-95 and IS-856 standards. A TDMA network may implement GSM and derivatives thereof such as, e.g., EDGE, EGPRS, etc. An OFDMA network may implement E-UTRA, UMB, IEEE 802.11 (Wi-Fi), IEEE 802.16 (WiMAX), IEEE 802.20, Flash-OFDM™, etc. UTRA and E-UTRA are part of UMTS. The specified methods and devices may be used in the framework of Multiple Input Multiple Output (MIMO). MIMO is a part of wireless communications standards such as IEEE 802.11n (Wi-Fi), 4G, 3GPP LTE, WiMAX and HSPA+.

Radio communications systems (or networks or systems) as described herein may include one or more receivers as well as one or more transmitters. A transmitter may be a base station or a transmitting device included in a user's device, such as a mobile radio transceiver, a handheld radio device or any similar device. A receiver (or receiver circuit) may be included in a mobile radio transceiver or a mobile station. For example, a mobile station may be represented by a cellular phone, a smartphone, a tablet PC, a laptop, etc. Circuits as described herein may e.g. be included in such receivers or transceivers.

It is noted that base stations considered herein may be of arbitrary type. For example, a base station may be a macro base station that may transmit at a "high" power level of about 5 W to about 40 W, or one of a pico cell, a femto cell or a relay, each of which may transmit at a "lower" power level of about 100 mW to about 2 W.

Methods and devices in accordance with the disclosure may utilize feedback information of different types. For example, employed feedback information may include one or more of a single-cell feedback information and a multi-cell feedback information. A more detailed description of such feedback information types is provided below.

For example, feedback information may comprise channel state information (CSI). In wireless communications, CSI may refer to channel properties of a communication link. Such information may specify how a signal propagates from a transmitter to a receiver and thereby may represent the combined effect of, for example, scattering, fading and power decay with distance. CSI may support link adaptation in order to achieve reliable communications with high data rates in radio communications systems. CSI may be estimated at the receiver and may be fed back to the transmitter in a quantized form.

CSI may include a channel quality indicator (CQI). A CQI may be based on a measurement of a communication quality of one or more wireless channels. Hence, a CQI may be a value (or values) representing a measure of a channel quality for a given channel. In particular, the term CQI may refer to information determined at a mobile station as well as to information determined at a mobile station and fed back to a base station and processed by the base station. For example, a high value CQI may be indicative of a channel with high quality and vice versa. A CQI may be computed by utilizing values of a Signal-to-Noise Ratio (SNR), Signal-to-Interference plus Noise Ratio (SINR), Signal-to-Noise plus Distortion Ratio (SNDR), a Signal to Leakage plus Noise Ratio (SNLR), etc. of a channel. A CQI may depend on an employed modulation scheme. For example, a communications system based on CDMA may utilize a different CQI compared to a communications system utilizing OFDM. In MIMO and space-time coded systems, a CQI may also depend on the receiver type.

CSI may include a Precoding Matrix Indicator (PMI). Methods and devices in accordance with the disclosure may utilize codebook entries like precoding weights, precoding vectors, precoding matrices, etc. In radio communications systems, a precoding scheme may be based on weighting multiple data streams emitted from the transmit antennas of a base station with weights that may be chosen to maximize a signal power at the receiver output, a link throughput and/or a sum capacity. In practice, a precoding codebook including multiple predetermined precoding weights (or precoding vectors or precoding matrices) may be stored in a base station such that appropriate weights may be chosen from the codebook on the basis of e.g. a Precoding Matrix Indicator (PMI). It is noted that examples for codebooks, codebook entries and associated PMI values may e.g. be found in 3GPP standards.

In a radio communications system, different codebooks may be defined depending on a number of transmit antenna ports of an employed base station. The codebooks may provide precoding support for a simultaneous transmission of variable number of layers (data streams) to an identical target mobile station. A PMI may be an index in the codebooks defined for a given number of transmit antenna ports (e.g. 1, 2, 4 in LTE and up to 8 for LTE-A).

CSI may include a Rank Indicator (RI). A channel RI may indicate the number of layers and the number of different signal streams transmitted in a downlink direction. For example, when using a Single Input Multiple Output (SIMO) one layer may be utilized. In case of a 2×2 MIMO system with spatial multiplexing two layers may be used.

Methods and devices in accordance with the disclosure may be based on a Coordinated Multi-Point (CoMP) scheme. In CoMP, multiple signals may be sent from multiple base stations or radio cells to a mobile station. By coordinating a transmission among the multiple cells, interference from other cells may be reduced and the power of the desired signals may be increased. Details on CoMP schemes are e.g. specified by 3GPP standards. A radio communications system including one or more mobile stations and one or more base stations may be referred to as CoMP cluster when the system is operating on the basis of a CoMP scheme.

Methods and devices in accordance with the disclosure may be based on a Single Frequency Network (SFN) scheme. An SFN may be considered as a network in which several transmitters, for example base stations, may concurrently transmit a same signal over a same frequency channel. Hence, an SFN may differ from a cellular telephone system by using a same frequency in all adjacent cells.

FIG. 1A illustrates a radio communications system 100A including a mobile station 1 (see "UE1"), a first base station 2A and a second base station 2B. It is understood that the radio communications system 100A may include further mobile stations and/or further base stations of arbitrary number which are not illustrated for the sake of simplicity. A radio cell served by the first base station 2A is indicated by a circle around the first base station 2A (see "Cell 1") while a radio cell served by the second base station 2B is indicated by a circle around the second base station 2B (see "Cell 2"). It is noted that the terms "base station", "radio cell" and "cell" may be used synonymously in this specification. In FIG. 1A, the mobile station (UE1) 1 is located at an edge of Cell 1. In such location, the mobile station 1 may be subject to interferences between signals broadcast by the base stations 2A and 2B.

The base stations 2A and 2B may be of different type or of similar type. For example, each of the base stations 2A and 2B may be a macro cell. In another example, the base station 2A may be a pico cell and the base station 2B may be a macro cell. In the latter case, Cell 1 may be arranged within the boundaries of Cell 2. In particular, the radio communications system 100A may be a heterogeneous network. A heterogeneous network may utilize a mix of diverse base stations deployed in order to improve a spectral efficiency per unit area. A layered network deployment may include a regular placement of macro base stations, overlaid with several pico cells, femto cells and relays that typically transmit at lower power levels.

The lower power cells may be deployed to eliminate coverage holes in the macro cells and to improve efficiency in hot spots.

In a heterogeneous network, a difference between low and high power base stations may result in an uneven distribution of data rates and uneven user experience among mobile stations located in the network. For example, a pico base station may be characterized by a substantially lower transmit power compared to a macro base station. Due to a large disparity between the transmit power levels of the two different base stations types, the coverage of a pico base station may be limited compared to that of a macro base station. A larger coverage of macro base stations may attract more users even if the base station may not have enough resources to efficiently serve all these mobile stations user terminals. At the same time, the resources of the smaller power base station may remain underutilized.

In order to deal with interference scenarios as they may occur in the radio communications system 100A, an interference management scheme enabling resource coordination among the base stations 2A and 2B may be employed such that interferences between signals broadcast by different base stations may be avoided or exploited. For example, an interference management scheme may be based on a CoMP concept. CoMP may simultaneously support multiple transmission points to serve mobile devices in high interference areas that occur between cells (inter-cell).

In an interference management scheme, the mobile station 1 may provide feedback information to each of the base stations 2A and 2B. For the case of the radio communications system 100A, it may be assumed that the mobile station 1 receives identical data streams from the base stations 2A and 2B (see "Stream 1"). Such assumption may be referred to as "Rank 1 hypothesis". It is noted that in FIG. 1A and all further examples described herein, a "data stream" transmitted between a base station and a mobile station may particularly refer to "dedicated" data, i.e. data that is actually intended to be transmitted between the mobile station and the base station. In contrast to such data, e.g. undesired interferences may also occur during a communication between the stations of the system. For example, a data stream may include a directional data beam which is aligned in a direction between the mobile station and the base station.

Data $Y_1$ received by the mobile station 1 from the base stations 2A and 2B may be expressed by $$Y_1 = H_{11}w_1x_1 + e^{j\gamma}H_{21}w_2x_1 + N, \qquad (1a)$$

wherein $H_{11}$ (respectively $H_{21}$) specifies a channel between the first base station 2A (respectively the second base station 2B) and the mobile station 1, for example in the form of a channel matrix. The parameters $w_1$ and $w_2$ denote precoding weights that may be used by the first base station 2A and the second base station 2B for precoding transmission data, respectively. It is noted that each of the parameters $w_1$ and $w_2$ may be associated with a respective PMI value $PMI_1$ and $PMI_2$. Further, the parameter $x_1$ denotes data transmitted from the base stations 2A and 2B (see "Stream 1") to the mobile station 1, the parameter $\gamma$ denotes an inter-cell phase information that may e.g. be quantized to two bits, the parameter j denotes complex unity, and the parameter N denotes noise. Using a vector/matrix notation, equation (1a) may also be expressed by $$Y_1 = [H_{11} \ H_{21}]\begin{bmatrix} w_1 \\ e^{j\gamma}w_2 \end{bmatrix}x_1 + N. \qquad (1b)$$

The mobile station 1 may determine feedback information that may be fed back to the first base station 2A and the second base station 2B, respectively. For example, a CQI may be determined based on the received data $Y_1$ and fed back to each of the first base station 2A and the second base station 2B. In particular, the CQI may be a "multi-cell rank 1" CQI, that is, (1) a CQI that is fed back to multiple cells included in a reporting set of the mobile station 1 (here: base stations 2A and 2B), and (2) a CQI that is determined based on the above-mentioned Rank 1 hypothesis. It is noted that the fed back multi-cell rank 1 CQI may particularly be identical for both base stations 2A and 2B. In addition, the mobile station 1 may e.g. determine and feed back a single-cell PMI for each of the first base station 2A and the second base station 2B as well as an inter-cell phase information. For example, the mobile station 1 may feed back the above-mentioned parameter $PMI_1$ to the first base station 2A, the parameter $PMI_2$ to the second base station 2B as well as the parameter $\gamma$ to the first base station 2A and/or the second base station 2B. It is noted that the values $PMI_1$ and $PMI2$ may particularly differ from each other. A feedback information as described in connection with FIG. 1A may be referred to as "multi-cell feedback information". Based on the received feedback information, each of the base stations 2A and 2B may adjust a data transmission.

FIG. 1B illustrates a radio communications system 100B including a mobile station 1 and two base stations 2A and 2B. The radio communications system 100B is similar to the radio communications system 100A of FIG. 1A. Comments made in connection with FIG. 1A may thus also hold true for FIG. 1B. For the case of the radio communications system 100B, it may be assumed that the mobile station 1 receives different data streams from the base stations 2A and 2B (see "Stream 1" and "Stream 2"). Such assumption may be referred to as "High rank hypothesis".

Data $Y_1$ received by the mobile station 1 from the base stations 2A and 2B may be expressed by $$Y_1 = H_{11}w_1x_1 + H_{21}w_2x_2 + N, \qquad (2a)$$

wherein $x_1$ and $x_2$ denote data received from the first base station 2A and the second base station 2B, respectively. All further parameters have been specified in connection with FIG. 1A. Using a vector/matrix notation, equation (2a) may be expressed by $$Y_1 = [H_{11}w_1 \ H_{21}w_2]\begin{bmatrix} x_1 \\ x_2 \end{bmatrix} + N. \qquad (2b)$$

Similar to FIG. 1A, the mobile station 1 may determine feedback information that may be fed back to the first base station 2A and to the second base station 2B. For example, a CQI may be determined based on the received data $Y_1$ and fed back to each of the first base station 2A and the second base station 2B. In particular, the CQI may be a "multi-cell high rank" CQI, that is, (1) a CQI that is fed back to multiple cells included in a reporting set of the mobile station 1 (here: base stations 2A and 2B), and (2) a CQI that is determined based on the above-mentioned High rank hypothesis. It is noted that the fed back multi-cell rank 1 CQI may particularly be different for both base stations 2A and 2B. In addition, the mobile station 1 may e.g. determine and feed back a single-cell PMI for each of Cell 1 and Cell 2. For example, the mobile station 1 may feed back the above-mentioned parameter $PMI_1$ to the first base station 2A and the parameter $PMI_2$ to the second base station 2B. The values $PMI_1$ and PMI2 may particularly differ from each other. It is noted that determining the values $PMI_1$ and PMI2 may thus particularly be based on a joint optimization. A feedback information as described in connection with FIG. 1B may also be referred to as "multi-cell feedback information".

FIG. 2 illustrates a method 200 in accordance with the disclosure including method actions 3 to 5. At 3, an information on a partitioned time interval is received at a circuit wherein the partitioned time interval includes a first time element and a second time element. At 4, a single-cell feedback information is determined based on first data wherein the first data is received by the circuit during the first time element. At 5, a multi-cell feedback information is determined based on second data wherein the second data is received by the circuit during the second time element. It is noted that a more detailed method similar to method 200 is described below.

FIG. 3 illustrates a circuit 300 in accordance with the disclosure. For example, the circuit 300 may be included in a mobile station as shown in various figures of this specification. An operation of the circuit 300 may be read in connection with the method 200, but is not limited thereto. The circuit 300 includes an input 6 configured to receive an information on a partitioned time interval wherein the partitioned time interval includes a first time element and a second time element (see method act 3 of method 200). The circuit 300 further includes a feedback information unit 7 configured to determine a single-cell feedback information based on the first data, wherein the first data is received by the circuit 300 during the first time element (see method act 4 of method 200). The feedback information unit 7 is further configured to determine a multi-cell feedback information based on the second data, wherein the second data is received by the circuit 300 during the second time element (see method act 5 of method 200). It is noted that a more detailed operation of a circuit similar to the circuit 300 is described below.

It is understood that the circuit 300 may include additional components which are not illustrated for the sake of simplicity. The circuit 300 may be configured to receive signals from one or more base stations. The circuit 300 may be included in a mobile station having one or more receive antennas wherein each of the receive antennas may be coupled to a respective antenna port of the circuit 300. Received analog signals may be down-converted to an intermediate band or a baseband. The analog down-converted signals may be sampled by a sampling unit and converted into the digital domain by an analog/digital converter. It is noted that components to perform such functions may particularly be arranged between the input 6 and the feedback information unit 7.

Feedback information determined by the circuit 300 may be broadcast by the circuit 300, for example in an Uplink direction to one or more base stations. For this purpose, the circuit 300 may be further configured to operate as a transmitter. Hence, it is understood that the circuit 300 may include additional components required to transmit a signal including the feedback information in an Uplink direction. For example, the circuit 300 may include a digital/analog converter for converting digital signals into analog signals, an up-conversion mixer for converting the analog signals to a radio-frequency band, a power amplifier, and/or antenna ports that may be connected to transmit antennas, etc.

A method for determining feedback information, for example in a network or a radio communications system, in accordance with the disclosure is described in the following. It is noted that the method may represent an interference management scheme for heterogeneous network deployments. The method is similar to method 200 and may be performed by a circuit similar to circuit 300. The method will be described in connection with FIGS. 4A, 4B and 5.

FIG. 4A illustrates a heterogeneous radio communications system 400A in a first scenario. The system 400A includes a macro base station 2A serving a macro radio cell (see "Cell 1") indicated by a circle around the macro base station 2A. The system 400A further includes a first pico base station 2B serving a first pico radio cell (see "Cell 2" indicated by a circle), a second pico base station 2C serving a second pico radio cell (see "Cell 3" indicated by a circle), a first mobile station 1A and a second mobile station 1B.

The first mobile station 1A is located within the serving boundaries of the macro base station 2A and within the serving boundaries of the first pico base station 2B. More particular, the first mobile station 1A is located at the edge of the first pico radio cell such that the first mobile station 1A may be subject to interferences between signal broadcast by the macro base station 2A and the first pico base station 2B. Since the first mobile station 1A is located within the serving boundaries of the first pico radio cell, the first pico base station 2B may represent a serving base station of the first mobile station 1A. In other words, the first mobile station 1A may be docked to the first pico base station 2B and the first mobile station 1A may be referred to as "pico UE" or "pico mobile station". A communication between the first mobile station 1A and the macro base station 2A as well as between the first mobile station 1A and the first pico base station 2B is indicated by directional data beams (see directional beams labeled "Stream 1" and "Stream 2" in FIG. 4A).

The second mobile station 1B is located within the serving boundaries of the macro base station 2A and outside of the serving boundaries of the second pico base station 2C. Hence, the macro base station 2A may be a serving base station of the second mobile station 1B such that the second mobile station 1B may be referred to as "macro UE" or "macro mobile station". Again, a communication between the specified stations is indicated by directional data beams (see two directional beams labeled "Stream 1"). Note that a communication between the second mobile station 1B and the second pico base station 2C may occur, even though the second mobile station 1B may be located outside the serving boundaries of the second pico base station 2C.

Figure 4B:
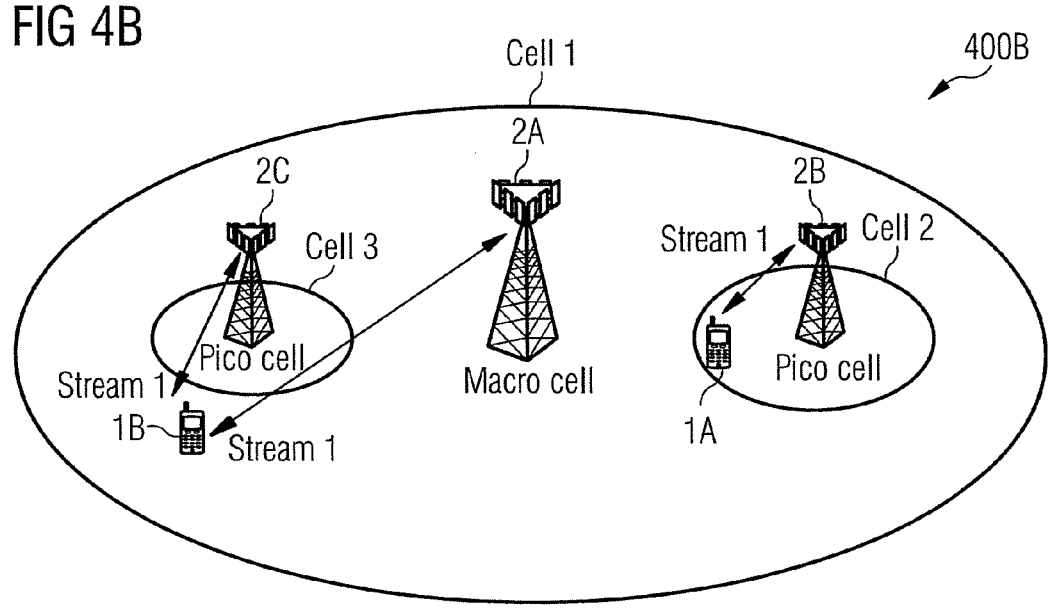
FIG. 4B illustrates a heterogeneous radio communications system 400B in a second scenario.

FIG. 4B illustrates a heterogeneous radio communications system 400B in a second scenario. The system 400B is similar to the system 400A of FIG. 4A. In contrast to the scenario of FIG. 4A, no directional data beam between the first mobile station 1A and the macro base station 2A is illustrated in FIG. 4B.

FIG. 5 illustrates two patterns 8A and 8B representing a partitioned time interval (or a partitioning of a time interval) that may be used for performing a method for determining feedback information. Each of the patterns 8A and 8B may represent a time interval having a length of e.g. 20 subframes numbered from 0 to 19. A subframe may have a length of e.g. one millisecond which may correspond to one time slot. A number of ten subframes may constitute a frame having a length of e.g. ten milliseconds. The time interval (or the patterns 8A and 8B) may be partitioned in a first time element including the subframes of even number (i.e. 0, 2, 4, etc.) and a second time element including the subframes of odd number (i.e. 1, 3, 5, etc.).

It is understood that the illustrated number of 20 subframes is exemplary. In general, the partitioned time interval may include an arbitrary number of subframes, in particular at least two subframes. Even more particular, each of the first time element and second time element may include at least one subframe.

It is further understood that the number of subframes included in the first time element does not necessarily need to equal the number of subframes included in the second time element. For example, the first time element may include more subframes than the second time element or vice versa.

In FIG. 5, the subframes of the first time element and the subframes of the second time element are alternating. It is understood that such arrangement is also exemplary. For example, the positions of the subframes of the first time element may simply be interchanged with the positions of the subframes of the second time element. In general, the positions of the subframes included in the first time element as well as the positions of the subframes included in the second time elements may be arbitrary.

As explained in the following, the patterns 8A and 8B (or the information on the partitioned time interval) may be used for determining a communication between the components of a network, e.g. the radio communications systems 400A and 400B. In particular, the pattern 8A may indicate a communication between the first mobile station 1A (or a circuit 300 included therein) and the macro base station 2A in the scenarios of FIGS. 4A and 4B. In a similar fashion, the pattern 8B may indicate a communication between the first mobile station 1A (or a circuit 300 included therein) and the first pico base station 2B in the scenarios of FIGS. 4A and 4B.

A circuit 300 in accordance with the disclosure may e.g. be included in the first mobile station 1A of FIGS. 4A and 4B. The circuit 300 may receive an information on a partitioned time interval as e.g. illustrated in FIG. 5. For the case of the circuit 300 being included in a pico mobile station served by the first pico base station 2B, the circuit 300 may receive an information on the partitioned time interval from by the serving first pico base station 2B. For example, the information on the partitioned time interval may be transmitted from the first pico base station 2B to the first mobile station 1A via an air interface. Prior to that, the information on the partitioned time interval may e.g. have been generated at the macro base station 2A and transmitted to the first pico base station 2B, for example via an optical fiber. After receiving the information on the partitioned time interval at the input 6 of the circuit 300, the information may be forwarded to the feedback information unit 7 of the circuit 300. Based on the received information on the partitioned time interval, the circuit 300 may then determine feedback information as described in the following in accordance with the disclosure. The feedback information may be fed back in an Uplink direction to at least one of the macro base station 2A, the first pico base station 2B, and further base stations of the network.

The subframes of even number (i.e. 0, 2, 4, etc.) may relate to the scenario of FIG. 4B. From the even subframes of the first pattern 8A (see "Non co-ordination subframes"), it may be seen that during these even subframes no data is served from the macro base station 2A to the first mobile station 1A. That is, the first pico base station 2B may only serve pico mobile stations while the macro base station 2A may only serve macro mobile stations such that there may not necessarily be a co-ordination between the macro base station 2A and the first pico base station 2B. In this connection, note that FIG. 4B does not show a directional data beam between the macro base station 2A and the first mobile station 1A.

It is noted that during the even subframes the macro base station 2A may still continue to transmit data to other components of the radio communications system 400B, for example the second mobile station 1B. Due to such continued transmission, a loss in the capacity of the macro base station 2A may be avoided compared to e.g. schemes employing Almost Blank Subframes (ABS). In this connection, it is noted that during the even non co-ordination subframes, signals transmitted between the first pico base station 2B and the first mobile station 1A may interfere with signals broadcast by the macro base station 2A to other network components (see second pattern 8B, "severe interference from macro cell"). The first pico base station 2B may thus be regarded as a victim cell base station while the macro base station 2A may be regarded as an aggressor cell base station.

During the non co-ordination subframes of even number, the circuit 300 thus may receive data from the first pico base station 2B. In contrast to this, the circuit 300 may not necessarily receive dedicated data from the macro base station 2A. It is understood that a communication between the macro base station 2A and the circuit 300 may not be suppressed completely. For example, the macro base station 2A may still continue to broadcast important signals like cell-specific reference signals, synchronization signals and/or broadcast messages.

Based on the data received during the (even) non co-ordination subframes, the circuit 300 may determine a single-cell feedback information, i.e. a feedback information that is based on data received from the first pico base station 2B, but not based on (dedicated) data received from the macro base station 2A. The single-cell feedback information may thus be optimized based on data received from one single cell.

It is noted that determining a feedback information may not necessarily depend on data received during only a single subframe. It is also possible that determined feedback information may be based on data received during multiple subframes. Selected subframes may be disregarded in determining the feedback information. In addition, it is also possible to average feedback information (or data used for determining feedback information) over multiple subframes wherein these multiple subframes may or may not be adjacent to each other.

The first mobile station 1A (or the circuit 300) may feedback the single-cell feedback information to its serving base station, i.e. the first pico base station 2B. The first pico base station 2B may use the feedback information to adjust a data transmission. It is understood that the feedback information may also be forwarded from the first pico base station 2B to one or more further base stations that may also use the feedback information for further operation.

It is noted that the receiving of data at the circuit 300, the determining of the feedback information, and the transmitting of the feedback information to one or more base stations may be executed in different subframes. That is, at least two of these actions or functions may be delayed with respect to each other. For example, data may be received by the circuit 300 during a subframe of arbitrary index n. Determining feedback information may then require one or more subframes before determined feedback information may be transmitted in an Uplink direction during an arbitrary subframe n+i. It is noted that such time delay may not necessarily have a significant impact for a case of slow changing channel conditions, e.g. for the case of a mobile station (or a circuit included therein) moving at a speed of about 30 km/h or less.

It is further noted that any suitable technique or scheme may be employed for determining the single-cell feedback information. The single-cell feedback information may e.g.

include at least one of a Precoding Matrix Indicator, a Rank Indicator, and a Channel Quality Indicator.

The subframes of odd number (i.e. 1, 3, 5, etc.) may relate to the scenario of FIG. 4A. From the odd subframes of the first pattern 8A (see "Co-ordination subframes"), it may be seen that during these odd subframes data is served from the macro base station 2A to the circuit 300. In this connection, FIG. 4A shows a directional data beam between the macro base station 2A and the first mobile station 1A. During the odd co-ordination subframes, the macro base station 2A may also transmit data to other units of the radio communications system 400A, for example the second mobile station 1B.

During the co-ordination subframes of odd number, the circuit 300 thus may receive data from the first pico base station 2B as well as data from the macro base station 2A. Based on the data received during the odd co-ordination subframes, the circuit 300 may determine a multi-cell feedback information. The multi-cell feedback information may thus be optimized based on data received from multiple base stations, i.e. a joint optimization. Such joint optimization may contribute to a co-ordination between the employed macro base stations and pico base stations such that the even subframes may be labeled as "co-ordination subframes".

It is noted that any suitable technique or scheme may be used to determine the multi-cell feedback information. For example, the multi-cell feedback information may be determined based on a CoMP scheme. The multi-cell feedback information may e.g. include at least one of a Precoding Matrix Indicator, a Rank Indicator, and a Channel Quality Indicator.

For example, at least one of the schemes described in connection with FIGS. 1A and 1B may be employed for determining the multi-cell feedback information. An exemplary determination is explained in the following. A Rank 1 multi-cell feedback information based on a Rank 1 hypothesis as described in connection with FIG. 1A may be determined. Based on this determined Rank 1 multi-cell feedback information, a first throughput value may be determined which would result if the determined Rank 1 multi-cell feedback information would actually be used for a further operation. In addition, a High Rank multi-cell feedback information based on a High Rank hypothesis as described in connection with FIG. 1B may be determined. Based on the determined High Rank multi-cell feedback information, a second throughput value may be determined which would result if the High Rank multi-cell feedback information would actually be used for a further operation. Depending on the determined first and second throughput value, it may be decided by the circuit 300 which of the determined feedback information may be fed back to one or more of employed base stations. If the first throughput value is greater than the second throughput value, the Rank 1 multi-cell feedback information may be transmitted in an Uplink direction. Alternatively, if the second throughput value is greater than the first throughput value, the High Rank multi-cell feedback information may be transmitted in an Uplink direction. For the case of the first throughput value equaling the second throughput value, the Rank 1 multi-cell feedback information or the High Rank multi-cell feedback information may be transmitted in an Uplink direction After determining the multi-cell feedback information, the first mobile station 1A may feedback the multi-cell feedback information to its serving base station, i.e. the first pico base station 2B. The first pico base station 2B may forward the multi-cell feedback information to one or more further base station that may also use the multi-cell feedback information for further operation.

Referring to the above described scheme, the circuit 300 thus may determine different feedback information depending on the considered subframe sets. For the case of non co-ordination subframes (here: even subframes), a single-cell feedback information may be determined. Further, for the case of co-ordination subframes (here: odd subframes), a multi-cell feedback information may be determined.

It is noted that the described systems 400A and 400B are exemplary and all comments made in this connection may also hold true for similar systems. For example, all previous comments may also hold true for a radio communications system which is similar to the systems 400A and 400B where the first pico base station 2B is replaced by a relay.

In addition, all previous comments may also hold true for a radio communications system similar to the systems 400A and 400B, but including additional base stations. For example, the first pico base station 2B may be included in a first set of first multiple coordinating base stations and the macro base station 2A may be included in a second set of second multiple coordinating base stations. A set of base stations may be referred to as "coordinated" or "coordinating" when an operation of a base station of the set is based on or depends on an operation of one or more of the other base stations of the set.

In an example, the first set of first multiple coordinating base stations may include a first CoMP cluster, i.e. a set of base stations operating on the basis of a CoMP scheme. The first pico base station 2B may be a part of the first CoMP cluster. Similarly, the second set of second multiple coordinating base stations may include a second CoMP cluster. The macro base station 2B may be a part of the second CoMP cluster.

In a further example, the first set of first multiple coordinating base stations may include a first SFN, and the second set of second multiple coordinating base stations may include a second SFN. The first pico base station 2B may be a part of the first SFN, and the macro base station 2B may be a part of the second SFN.

Figure 6:
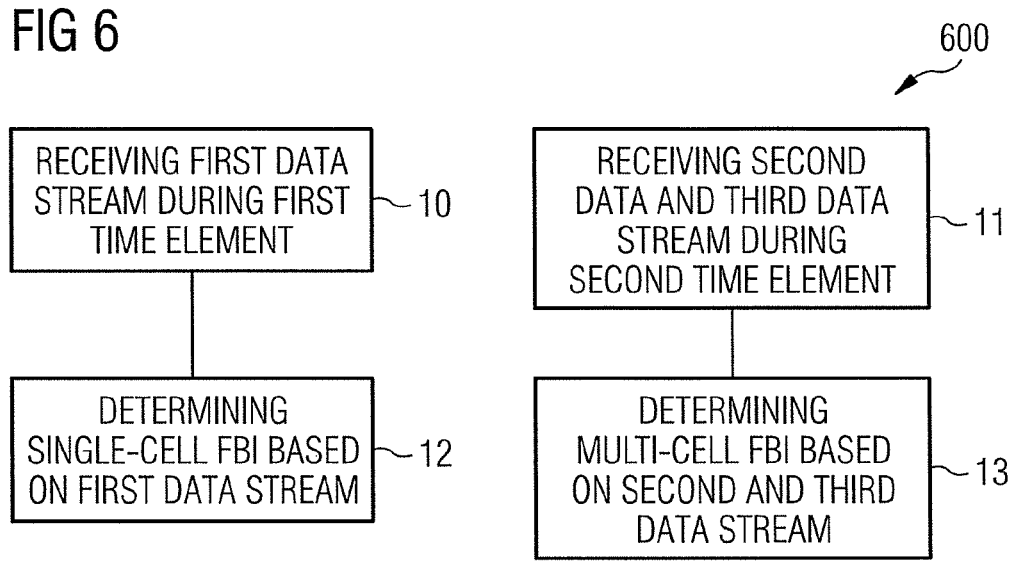
FIG. 6 illustrates an exemplary method 600 for determining feedback information based on data streams received from base stations.

FIG. 6 illustrates a method 600 in accordance with the disclosure including method actions 10 to 13. At 10, at a circuit and during a first time element, a first data stream is received from a first base station. At 11, at the circuit and during a second time element, a second data stream is received from the first base station and a third data stream is received from a second base station. At 12, a single-cell feedback information is determined based on the first data stream. At 13, a multi-cell feedback information is determined based on the second data stream and the third data stream. All comments made in connection with the above-described schemes for determining feedback information may also hold true for method 600.

Figure 7:
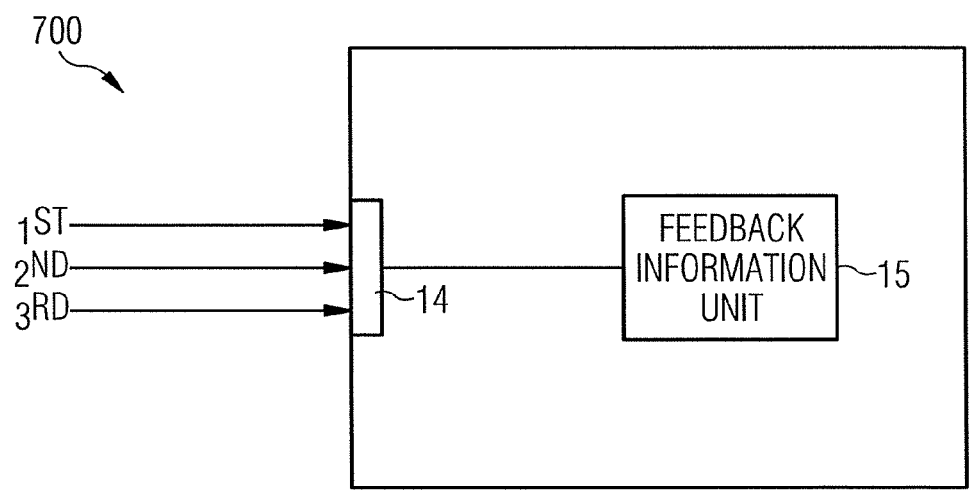
FIG. 7 illustrates an exemplary circuit 700 configured to determine feedback information, e.g. by performing a method similar to method 600.

FIG. 7 illustrates an exemplary circuit 700 in accordance with the disclosure. For example, the circuit 700 may be included in a mobile station as shown in various figures of this specification. An operation of the circuit 700 may be read in connection with the method 600, but is not limited thereto. The circuit 700 includes an input 14 configured to receive during a first time element a first data stream (see "$1^{st}$") from a first base station (see method act 10 of method 600) and during a second time element a second data stream (see "$2^{nd}$") from the first base station and a third data stream (see "$3^{rd}$") from a second base station (see method act 11 of method 600). The circuit 700 further includes a feedback information unit 15 configured to determine a single-cell feedback information based on the first data stream (see method act 12 of method 600) and to determine a multi-cell feedback information based on the second data stream and the third data stream (see method act 13 of method 600).

Figure 8:
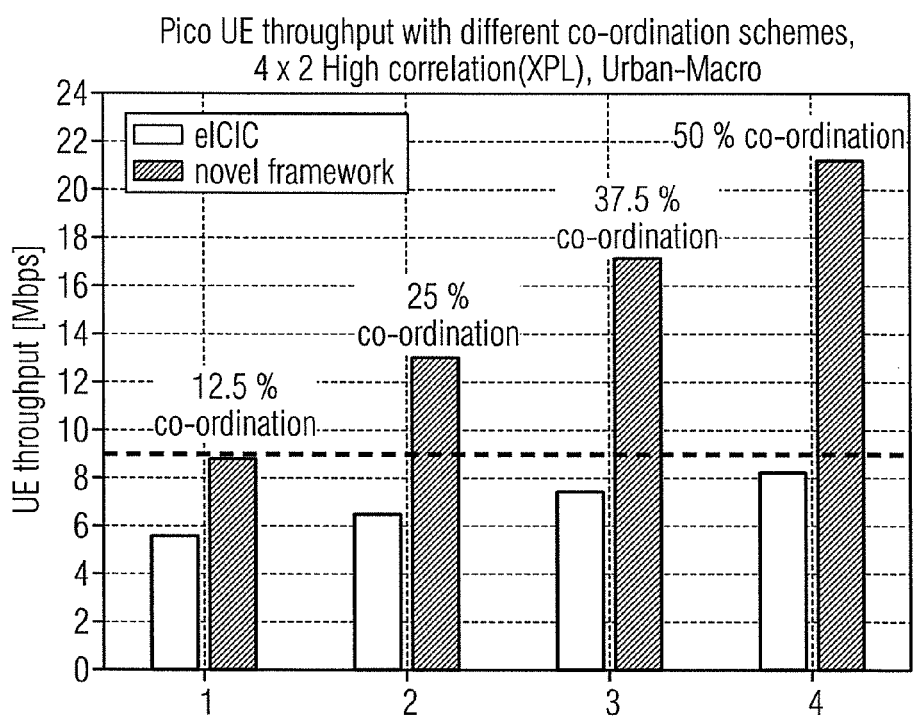
FIG. 8 illustrates performances of a mobile station.

FIG. 8 schematically illustrates performances of a User Equipment operating according to various schemes, namely an enhanced Inter-Cell Interference Coordination (eICIC) scheme (see white bars, "eICIC") and a scheme in accordance with the disclosure (see black bars, "novel framework").

A throughput in Mbps of a considered (pico) mobile station is shown for various levels of co-ordination. A level of co-ordination may represent a percent of ABS (for eICIC) and co-ordination subframes (for the framework in accordance with the disclosure), respectively. It is noted that increasing the level of co-ordination may reduce a resource utilization of a macro cell since during these subframes the macro base station may not necessarily serve macro mobile stations. Therefore it may be desirable to reduce the level of co-ordination to minimize a loss of macro cell capacity.

It is assumed that the considered pico mobile station operates with a cell range expansion factor of 20 dB which corresponds to a Signal-to-Interference Ratio of −20 dB. For the eICIC scheme, it is assumed that the mobile station employs a CRS-IC (Pilot interference cancellation) scheme and noise-whitening, whereas for the framework in accordance with the disclosure only noise-whitening is applied.

As it can be seen from FIG. 8, with 12.5% co-ordination, the scheme in accordance with the disclosure may achieve a better mobile station throughput (see horizontal dashed line) than the eICIC scheme with 50% ABS. From this observation it may be seen that the scheme in accordance with the disclosure (1) may achieve better resource utilization of the macro-cell and hence reduces loss of macro-cell capacity, (2) may enhance the ability of a mobile station to operate with high cell-range expansion, (3) may balance load distribution of macro cells and pico cells, and (4) may increase an overall system throughput.

While the disclosure has been illustrated and described with respect to one or more implementations, alterations and/or modifications may be made to the illustrated examples without departing from the spirit and scope of the appended claims. Also, techniques, systems, subsystems and methods described and illustrated in the various aspects may be combined with other techniques, systems, subsystems and methods without departing from the scope of the present disclosure. Other examples of changes, substitutions and alterations are ascertainable by one skilled in the art and could be made without departing from the spirit and scope disclosed herein.

What is claimed is:

1. A method, comprising:
   receiving at a circuit an information on a partitioned time interval, wherein the partitioned time interval comprises a first time element and a second, different time element;
   determining a single-cell feedback information based on first data, wherein the first data is received by the circuit during the first time element;
   determining a multi-cell feedback information based on second data, wherein the second data is received by the circuit during the second time element, wherein determining the multi-cell feedback information comprises:
      determining a Rank 1 multi-cell feedback information based on a Rank 1 hypothesis;
      determining a first throughput value based on the Rank 1 multi-cell feedback information;
      determining a High Rank multi-cell feedback information based on a High Rank hypothesis;
      determining a second throughput value based on the High Rank multi-cell feedback information;
      if the first throughput value is greater than the second throughput value, transmitting the Rank 1 multi-cell feedback information in an Uplink direction;
      if the second throughput value is greater than the first throughput value, transmitting the High Rank multi-cell feedback information in an Uplink direction; and
   performing link adaptation of the circuit based on at least one of the single-cell feedback information and the multi-cell feedback information.

2. The method of claim 1, wherein the first time element comprises a first set of first subframes and the second time element comprises a second set of second subframes.

3. The method of claim 1, wherein the single-cell feedback information and the multi-cell feedback information comprises at least one of a Precoding Matrix Indicator, a Rank Indicator, and a Channel Quality Indicator.

4. The method of claim 1, wherein:
   the first data is based on a first data stream received by the circuit from a first base station, and
   the second data is based on a second data stream received by the circuit from the first base station and a third data stream received by the circuit from a second base station.

5. The method of claim 4, wherein at least one of the first data stream, the second data stream and the third data stream comprises a directional data beam.

6. The method of claim 4, wherein the information on the partitioned time interval is received at the circuit from the first base station.

7. The method of claim 4, wherein the first base station and the second base station are comprised in a heterogeneous network.

8. The method of claim 4, wherein the first base station is comprised in a first set of first multiple coordinating base stations and the second base station is comprised in a second set of second multiple coordinating base stations.

9. The method of claim 8, wherein the first set of first multiple coordinating base stations comprises a first Coordinated Multi Point cluster and the second set of second multiple coordinating base stations comprises a second Coordinated Multi Point cluster.

10. The method of claim 8, wherein the first set of first multiple coordinating base stations comprises a first single frequency network and the second set of second multiple coordinating base stations comprises a second single frequency network.

11. The method of claim 4, wherein the first base station comprises a pico cell base station or a relay and the second base station comprises a macro cell base station.

12. The method of claim 4, wherein the first base station comprises a victim cell base station and the second base station comprises an aggressor cell base station.

13. The method of claim 4, wherein the first base station comprises a serving cell base station configured to serve the circuit.

14. The method of claim 1, further comprising:
   transmitting at least one of the single-cell feedback information and the multi-cell feedback information in an Uplink direction.

15. The method of claim 1, wherein determining the multi-cell feedback information is based on a Coordinated Multi Point scheme.

16. The method of claim 1, wherein the circuit is comprised in a mobile station.

17. A circuit, comprising:
an input port configured to receive an information on a partitioned time interval, wherein the partitioned time interval comprises a first time element and a second, different time element;
a feedback information component configured to determine a single-cell feedback information based on first data, wherein the first data is received by the circuit during the first time element, and determine a multi-cell feedback information based on second data, wherein the second data is received by the circuit during the second time element, wherein the feedback information component is configured to determine the multi-cell feedback information by:
  determining a Rank 1 multi-cell feedback information based on a Rank 1 hypothesis;
  determining a first throughput value based on the Rank 1 multi-cell feedback information;
  determining a High Rank multi-cell feedback information based on a High Rank hypothesis;
  determining a second throughput value based on the High Rank multi-cell feedback information;
  if the first throughput value is greater than the second throughput value, transmitting the Rank 1 multi-cell feedback information in an Uplink direction for providing link adaptation of the circuit;
  if the second throughput value is greater than the first throughput value, transmitting the High Rank multi-cell feedback information in an Uplink direction for providing link adaptation of the circuit;
wherein the feedback information component is further configured to transmit the single-cell feedback information in an Uplink direction for providing link adaptation for the circuit.

18. The circuit of claim 17, wherein:
the first data is based on a first data stream received by the circuit from a first base station, and
the second data is based on a second data stream received by the circuit from the first base station and a third data stream received by the circuit from a second base station.

19. A method, comprising:
receiving at a circuit during a first time element a first data stream from a first base station;
receiving at the circuit during a second, different time element a second data stream from the first base station and a third data stream from a second base station;
determining a single-cell feedback information based on the first data stream;
determining a multi-cell feedback information based on the second data stream and the third data stream, wherein determining the multi-cell feedback information comprises:
  determining a Rank 1 multi-cell feedback information based on a Rank 1 hypothesis;
  determining a first throughput value based on the Rank 1 multi-cell feedback information;
  determining a High Rank multi-cell feedback information based on a High Rank hypothesis;
  determining a second throughput value based on the High Rank multi-cell feedback information;
  if the first throughput value is greater than the second throughput value, transmitting the Rank 1 multi-cell feedback information in an Uplink direction;
  if the second throughput value is greater than the first throughput value, transmitting the High Rank multi-cell feedback information in an Uplink direction; and
performing link adaptation of the circuit based on at least one of the single-cell feedback information and the multi-cell feedback information.

20. The method of claim 19, wherein at least one of the first data stream, the second data stream and the third data stream comprises a directional data beam.

21. The method of claim 19, wherein each of the first data stream, the second data stream and the third data stream is dedicated to the circuit.

22. The method of claim 19, wherein the first time element comprises a first set of first subframes and the second, different time element comprises a second set of second subframes.

23. A circuit, comprising:
an input port configured to receive during a first time element a first data stream from a first base station and during a second, different time element a second data stream from the first base station and a third data stream from a second base station;
a feedback information component configured to determine a single-cell feedback information based on the first data stream and to determine a multi-cell feedback information based on the second data stream and the third data stream, wherein the feedback information component is configured to determine the multi-cell feedback information by:
  determining a Rank 1 multi-cell feedback information based on a Rank 1 hypothesis;
  determining a first throughput value based on the Rank 1 multi-cell feedback information;
  determining a High Rank multi-cell feedback information based on a High Rank hypothesis;
  determining a second throughput value based on the High Rank multi-cell feedback information;
  if the first throughput value is greater than the second throughput value, transmitting the Rank 1 multi-cell feedback information in an Uplink direction for providing link adaptation of the circuit;
  if the second throughput value is greater than the first throughput value, transmitting the High Rank multi-cell feedback information in an Uplink direction for providing link adaptation of the circuit; and
wherein the feedback information component is further configured to transmit the single-cell feedback information in an Uplink direction for providing link adaptation for the circuit.

24. The circuit of claim 23, wherein the circuit is configured to:
receive an information on a partitioned time interval, wherein the partitioned time interval comprises the first time element and the second time element; and
determine the single-cell feedback information during the first time element and determine the multi-cell feedback information during the second time element.

* * * * *